(12) United States Patent
Matthews et al.

(10) Patent No.: US 11,574,182 B2
(45) Date of Patent: Feb. 7, 2023

(54) PHYSICAL DEVICE INSPECTION OR REPAIR

(71) Applicant: Apkudo LLC, Baltimore, MD (US)

(72) Inventors: Josh Matthews, Baltimore, MD (US); Kevin King, Baltimore, MD (US); Benjamin Leslie, Baltimore, MD (US); Jason Hihn, Baltimore, MD (US)

(73) Assignee: APKUDO, INC., New York, NY (US)

( * ) Notice: Subject to any disclaimer, the term of this patent is extended or adjusted under 35 U.S.C. 154(b) by 755 days.

(21) Appl. No.: 16/515,227

(22) Filed: Jul. 18, 2019

(65) Prior Publication Data

US 2021/0019614 A1 Jan. 21, 2021

(51) Int. Cl.
*G06N 3/08* (2006.01)
*G05B 19/4155* (2006.01)

(52) U.S. Cl.
CPC ........... *G06N 3/08* (2013.01); *G05B 19/4155* (2013.01); *G05B 2219/45199* (2013.01)

(58) Field of Classification Search
CPC .............................. G06N 3/08; G05B 19/4155
See application file for complete search history.

(56) References Cited

U.S. PATENT DOCUMENTS

| | | | | |
|---|---|---|---|---|
| 5,437,737 A | * | 8/1995 | Draghi | B23P 6/007 420/559 |
| 2010/0235037 A1 | * | 9/2010 | Vian | G05D 1/0027 702/183 |
| 2011/0087352 A1 | * | 4/2011 | Krause | G06T 7/001 700/98 |
| 2016/0225036 A1 | | 8/2016 | Nguyen | |
| 2018/0293734 A1 | * | 10/2018 | Lim | G06T 7/0004 |

FOREIGN PATENT DOCUMENTS

| | | |
|---|---|---|
| JP | 2019-057043 A | 4/2019 |
| WO | 2018-156869 A1 | 8/2018 |
| WO | 2018-191421 A1 | 10/2018 |
| WO | 2019-046400 A1 | 3/2019 |
| WO | WO-2020216596 A1 * 10/2020 ............. F03D 17/00 |

OTHER PUBLICATIONS

International Search Report and Written Opinion issued in corresponding International Application No. PCT/US2020/042615 dated Nov. 6, 2020.

* cited by examiner

*Primary Examiner* — Mark A Connolly
(74) *Attorney, Agent, or Firm* — Pillsbury Winthrop Shaw Pittman LLP (57) ABSTRACT

In certain embodiments, device inspection or repair may be facilitated via signal-based determinations. In some embodiments, one or more flaws may be detected on a portion of a device via an optical sensor. Based on the detection, a physical structure may be caused to physically interact with the portion of the user device. Information indicating signals from the physical interaction may be obtained. Based on the signal information, a determination of whether a repair process should be performed on the device may be effectuated. The device may be assigned to be repaired via the repair process based on the determination indicating that the repair process should be performed on the device. In some embodiments, the signal information may be provided to a prediction model to determine whether the repair process should be performed on the device.

18 Claims, 5 Drawing Sheets

PHYSICAL DEVICE INSPECTION OR REPAIR

FIELD OF THE INVENTION

The invention relates to device inspection or repair, including, for example, facilitating device inspection/repair or resource usage reduction for a repair facility via signal-based determinations or via a neural network or other prediction model.

BACKGROUND OF THE INVENTION

Advances in computing power and software development technologies (including technologies that facilitate automated assembly and repair) have made assembling and repairing devices faster and less costly. Despite such advancements, assembly and repair systems typically waste resources performing one or more unnecessary types of operations. As an example, with respect to scratch buffing, scratch buffing will often be performed on mobile devices with scratches or other similar physical flaws that cannot be buffed out to a satisfactory quality (e.g., such that the physical flaw is no longer practicably observable to the naked human eye). Thus, in such cases, time, energy, and other resources (whether machine or human resources) are needlessly utilized on such mobile devices. These and other drawbacks exist.

SUMMARY OF THE INVENTION

Aspects of the invention relate to methods, apparatuses, and/or systems for facilitating device inspection or repair via signal-based determinations or resource usage reduction for a repair facility via such signal-based determinations.

In some embodiments, one or more scratches or other flaws may be detected on a portion of a user device (e.g., via an optical sensor or other sensor). Based on the detection, a physical structure may be caused to physically interact with the portion of the user device. As an example, one or more structures (e.g., sharp tips, thin structures, or other structures) may be controlled to physically interact with the portion of the user device. Signals from the physical interaction of the physical structure with the user device may be obtained via a microphone or other sensor. Based on the obtained signals, a determination of whether scratch buffing or another repair process should be performed on the user device may be effectuated. The user device may be assigned to be repaired via the repair process based on the determination indicating that the repair process should be performed on the user device. In some embodiments, based on the assignment of the user device, the repair process may be automatically performed to repair the detected flaws.

In some embodiments, training information may be provided as input to a prediction model to generate predictions related to whether the repair process should be performed on one or more user devices. As an example, the training information may indicate signals from interactions with the user devices (e.g., from interactions with flaws of the user devices). In some embodiments, repair result information may be provided as reference feedback to the prediction model. As an example, the repair result information may be related to performance of a repair process on the user devices (e.g., information indicating whether the repair process should be performed on the user devices, information indicating whether the repair process was successful in repairing the user device with respect to its detected flaws, etc.). As another example, the prediction model may update one or more portions of the prediction model based on the predictions and the repair result information. Subsequent to the updating of the prediction model, the prediction model may be used to process information related to signals from interactions with a user device (e.g., from interactions with flaws of the user device) to determine whether the repair process should be performed on the user device.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
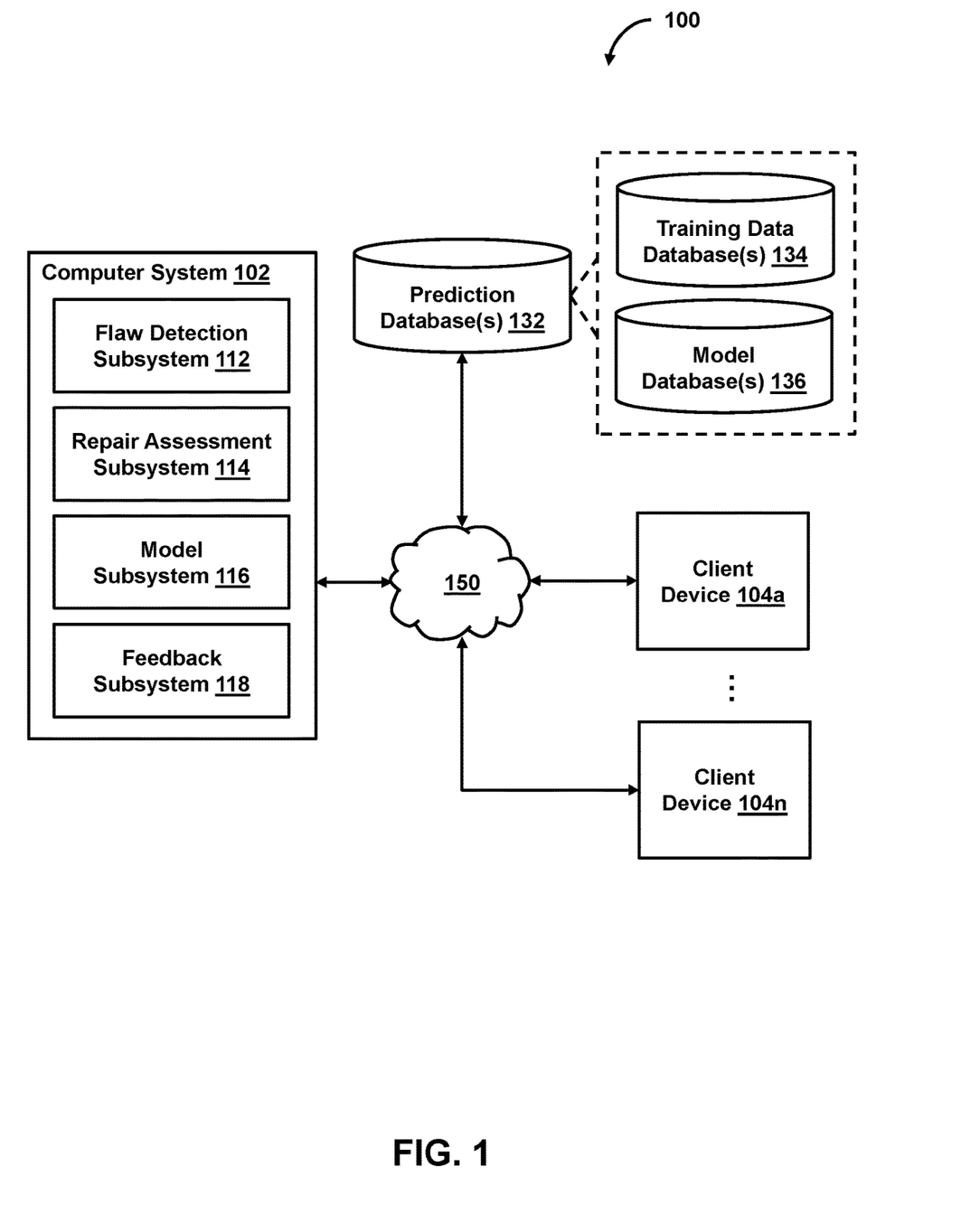
FIG. 1 shows a system for facilitating device inspection or repair, in accordance with one or more embodiments.

FIG. 1 shows a system 100 for facilitating device inspection or repair, in accordance with one or more embodiments. As shown in FIG. 1, system 100 may include computer system 102, client device 104 (or client devices 104a-104n), or other components. Computer system 102 may include flaw detection subsystem 112, repair assessment subsystem 114, model subsystem 116, feedback subsystem 118, or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

In some embodiments, system 100 may facilitate inspection or repair for a device (e.g., a phone, tablet, wearable device, laptop, or other user device) based on information derived from one or more surfaces or other portions of the device. In some embodiments, such information may include information related to signals from interactions with at least a portion of the device. As an example, system 100 may use the signal-related information to assign the device to a process or cause performance of the process on the device. In some embodiments, system 100 may obtain information related to signals from interactions with one or more flaws of the device (e.g., scratches or other flaws of the device) and determine, based on such obtained information, whether a repair process (e.g., buffing of one or more portions of the user device, filling in or painting over structural damages, providing resurfacing or covering of structural damages, or other repair process) should be performed on the device, whether the device satisfies one or more criteria related to a repair type of the repair process, or whether one or more other processes should be performed on the device.

In some embodiments, system 100 may detect one or more flaws on a portion of a user device (e.g., via a camera or other optical sensor, via a microphone or other sound sensor, via physical sensing, etc.) and, based on detecting the flaws to be located on the portion of the user device, cause a physical structure to physically interact with the portion of the user device. As an example, one or more structures (e.g., sharp tips, thin structures, or other structures) may be controlled to physically interact with the portion of the user device. System 100 may obtain information related to signals from the interaction with the portion of the user device via a microphone or other sensor and determine, based on the obtained information, whether a repair process should be performed on the user device. As an example, the obtained information may include information indicating the signals from the interaction with the detected flaws, the signals from the interaction with other areas of the portion of the user device, or other signals, and system 100 may perform the foregoing determination based on such signal information. Thus, in scenarios in which a repair process is avoided (e.g., based on a determination that the repair process is unlikely to satisfiability repair a detected flaw), resources related to the repair process may be saved, thereby reducing such resource usage reduction for a repair facility or other facility performing such repairs or related activities.

In some embodiments, system 100 may train or configure a prediction model to facilitate inspection or repair for a device. In some embodiments, system 100 may obtain information related to signals from interactions with flaws of one or more devices and provide such information provided as input to a prediction model to generate predictions (e.g., related to whether a repair process should be performed on the devices). As an example, the obtained information may include information indicating signals from movement of the physical structure during the physical interaction or other information related to signals from the physical interaction. As another example, the obtained information related to signals corresponding to mechanical waves (e.g., sound or other mechanical waves) from the interaction with such flaws, information related to signals corresponding to electromagnetic waves (e.g., light or other electromagnetic waves) from the interaction with such flaws, or other information. System 100 may provide repair result information as reference feedback to the prediction model, and the prediction model may update one or more portions of the prediction model based on the predictions and the repair result information. As an example, the repair result information may be related to performance of the repair process on the devices (e.g., information indicating whether the repair process should be performed on the devices, information indicating whether the repair process was successful in repairing the devices with respect to their detected flaws, etc.). In this way, for example, the prediction model may be trained or configured to generate more accurate predictions.

As such, in some embodiments, subsequent to the updating of the prediction model, system 100 may use the prediction model to perform an inspection on a device. As an example, system 100 may obtain and provide information related to signals from interactions with flaws of the device to the prediction model to obtain one or more predictions from the prediction model. System 100 may use the predictions to determine whether to perform the repair process on the device or to generate other determinations. In one use case, the prediction model may generate a prediction specifying that the repair process should or should not be performed on the device. In another use case, the prediction model may generate a prediction specifying a probability that performance of the repair process will produce a satisfiable result (e.g., buffing of the device will render all scratches practicably unobservable to the naked human eye).

In some embodiments, the prediction model may include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

Figure 2:
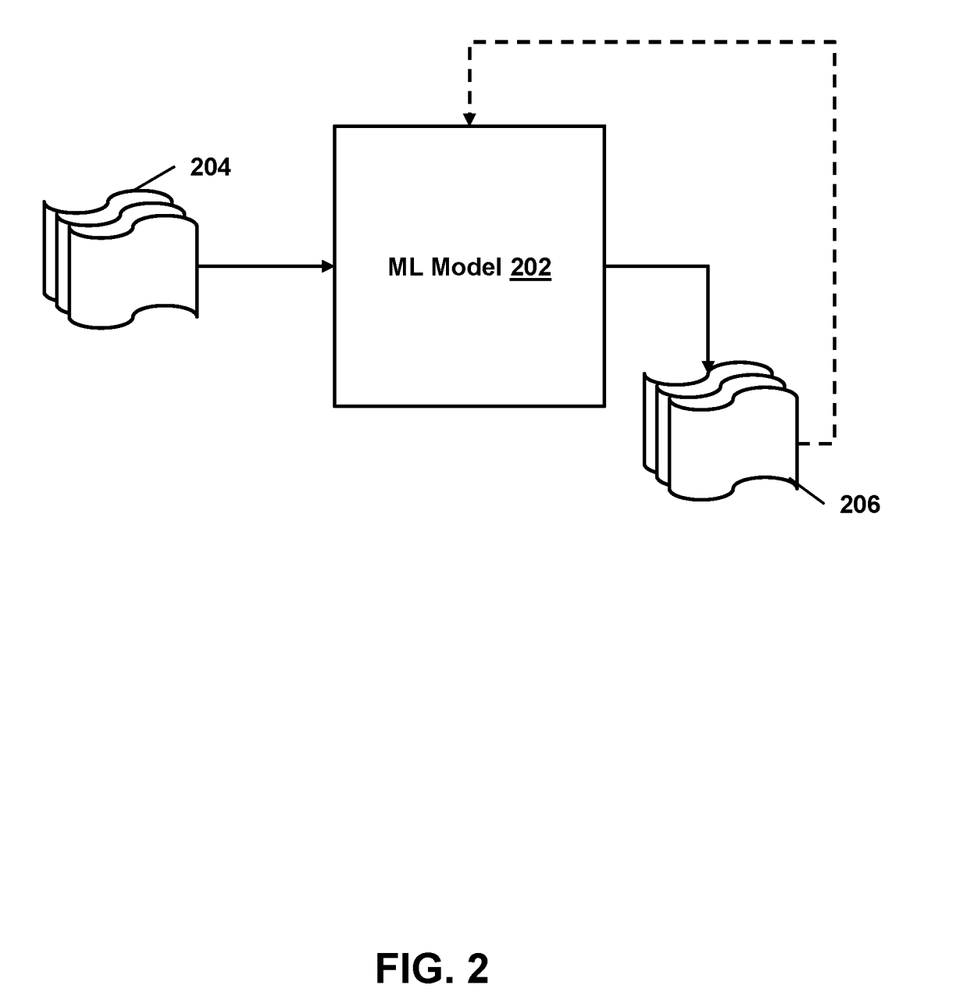
FIG. 2 shows a machine learning model configured to facilitate device inspection or repair, in accordance with one or more embodiments.

As an example, with respect to FIG. 2, machine learning model 202 may take inputs 204 and provide outputs 206. In one use case, outputs 206 may be fed back to machine learning model 202 as input to train machine learning model 202 (e.g., alone or in conjunction with user indications of the accuracy of outputs 206, labels associated with the inputs, or with other reference feedback information). In another use case, machine learning model 202 may update its configurations (e.g., weights, biases, or other parameters) based on its assessment of its prediction (e.g., outputs 206) and reference feedback information (e.g., user indication of accuracy, reference labels, or other information). In another use case, where machine learning model 202 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 202 may be trained to generate better predictions.

Subsystems 112-118

In some embodiments, repair assessment subsystem 114 may cause a physical structure (e.g., a record needle or other physical implement) to physically interact with at least a portion of a user device (e.g., a portion that includes one or more flaws). As an example, the flaws may include scratches, cracks, dents, other physical damages, or other flaws (e.g., discoloring or other physical flaws), and one or more image or object recognition techniques may be utilized to detect the flaws. In one use case, the physical structure used for the physical interaction may be made of material that will not damage the portion of the user device (e.g., material having a hardness less than the hardness of the portion of the user device). In a further use case, the portion of the user device may be a portion of a glass surface of a display screen of the user device, a portion of a metal surface of a case of the user device, or other portion of the user device. In response to the physical interaction, repair assessment subsystem 114 may obtain information related to the signals from the physical interaction of the physical structure with the portion of the user device. Based on the obtained information, repair assessment subsystem 114 may determine whether a repair process should be performed on the user device. As an example, the repair process may include buffing of one or more portions of the user device, filling in or painting over structural damages, providing resurfacing or covering of structural damages, or other repair process (e.g., to mitigate the detected flaws or otherwise repair the user device). As a further example, the obtained information may include information indicating signals from movement of the physical structure during the physical interaction or other information related to signals from the physical interaction. As another example, the obtained information related to signals corresponding to mechanical waves (e.g., sound or other mechanical waves) from the interaction with such flaws, information related to signals corresponding to electromagnetic waves (e.g., light or other electromagnetic waves) from the interaction with such flaws, or other information.

Figure 3:
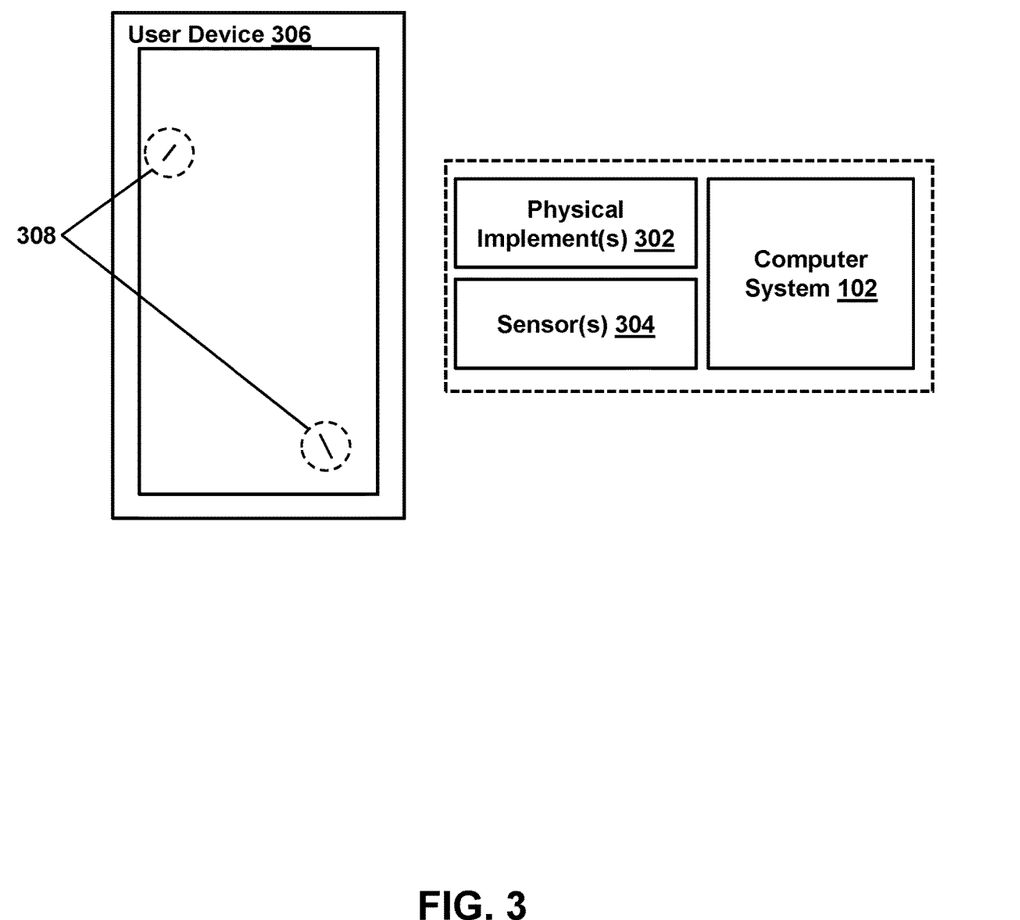
FIG. 3 shows an inspection computer system performing an inspection of a user device, in accordance with one or more embodiments.

In one scenario, with respect to FIG. 3, computer system 102 may utilize one or more physical implements 302, one or more sensors 304, or other components to perform an inspection of user device 306. As an example, computer system 102 may utilize one or more physical implements 302 (e.g., record needles or other physical implements) to cause the physical implements 302 to physically interact with one or more surfaces of the user device 306. In response, computer system 102 may obtain electrical signals caused by the interactions with the surfaces of the user device 306 (e.g., the interactions with scratches or other flaws on such surfaces). Computer system 102 may use the obtained signal information to determine whether scratch buffing or another repair process should be performed on the user device 306. As an example, the obtained signal information may indicate signal patterns related to scratches on at least a portion of a glass surface of a display screen of the user device, and computer system 102 may perform the foregoing determination based on the indicated signal patterns.

In some embodiments, flaw detection subsystem 112 may detect one or more flaws on a portion of the user device (e.g., via a camera or other optical sensor, via a microphone or other sound sensor, via physical sensing, etc.), and repair assessment subsystem 114 may cause physical interaction with the portion of the user device based on the detection of the flaws. In one scenario, with respect to FIG. 3, computer system 102 may utilize one or more sensors 304 to detect scratches 308 on a portion of user device 306. Based on the detection, computer system may utilize one or more physical implements 302 (e.g., record needles or other physical implements) to cause a physical interaction of at least one of the physical implements 302 with the detected scratches 308 and, in response, obtain information related to the signals from the interaction with the detected scratches 308 (e.g., via one or more sensors 304). Computer system 102 may use the obtained information to determine whether scratch buffing or another repair process should be performed on the user device 306.

In some embodiments, repair assessment subsystem 114 may cause one or more waves to occur at a portion of a user device via one or more physical sensing techniques and, in response, obtain signal information related to the waves coming from the portion of the user device (e.g., via one or more sensors). In some embodiments, repair assessment subsystem 114 may control one or more structures (e.g., sharp tips, thin structures, or other structures) to physically interact with the portion of the user device to cause waves to originate from the portion of the user device (e.g., vibrations from the physical interaction). As an example, the structures used to create the signals may be made of material that will not damage the portion of the user device (e.g., material having a hardness less than the hardness of the portion of the user device). In some embodiments, repair assessment subsystem 114 may cause one or more waves to reflect off a portion of a user device via one or more emitters (e.g., speaker, light source, etc.) and, in response, obtain signal information related to the waves coming from the portion of the user device (e.g., via one or more sensors). Based on the obtained signal information, repair assessment subsystem 114 may determine whether a repair process should be performed on the user device. As an example, the obtained signal information may indicate signal patterns related to scratches on at least a portion of a glass surface of a display screen of the user device, and repair assessment subsystem 114 may perform the foregoing determination based on the indicated signal patterns.

In some embodiments, repair assessment subsystem 114 may assign a user device to a repair process or initiate the repair process on the user device based on signal-related information (e.g., obtained in response to interactions with the user device). As an example, repair assessment subsystem 114 may determine whether a repair process should be performed on the user device, determine whether the user device satisfies one or more criteria related to a repair type of the repair process, or perform other determinations based on the signal-related information. The user device may be assigned to the repair process, or the repair process may be initiated, based on one or more of the foregoing determinations (e.g., that the repair process should be performed on the user device, that the user device satisfies the related criteria, etc.). As another example, the repair process may automatically be performed and completed in response to one or more of the foregoing determinations (e.g., that the repair process should be performed on the user device, that the user device satisfies the related criteria, etc.). In one use case, upon determination that scratch buffing should be performed on a surface of a display screen of the user device, repair assessment subsystem 114 may automatically execute instructions to place the user device on an automated assembly line to be repaired, to perform the scratch buffing on the surface of the user device display screen, or perform other operations related to the repair process.

In some embodiments, repair assessment subsystem 114 may determine not to assign a user device to a repair process or initiate the repair process on the user device based on signal-related information. As an example, based on the signal-related information, repair assessment subsystem 114 may determine that the repair process should not be performed on the user device or that the user device fails to satisfy one or more criteria related to a repair type of the repair process. Based on one or more of the foregoing determinations, the user device may not be assigned to the repair process, and the repair process may not be initiated for the user device. In one use case, the user device may be assigned to a non-repair process (e.g., sell as used or "as is" product, a discard process, etc.) or other different process based on the foregoing determinations. In this way, for example, the repair process may be avoided (e.g., based on a determination that the repair process is unlikely to satisfiability repair a detected flaw), thereby saving resources related to the repair process. In one scenario, where an inspection/repair system automatically performs the repair process (e.g., when the inspection/repair system determines that the repair process should be performed), the inspection/repair system may avoid performing the repair process on any user device for which a determination not to perform the repair is made, thereby causing the inspection/repair system to be more efficient, thereby reducing resource usage along with increasing productivity of satisfiable repairs (e.g., due to resources being used instead to repair flaws that can be satisfiably repaired).

It should be noted that, in some embodiments, dimensional information identifying one or more physical dimensions of flaws on a user device need not necessarily be known to determine whether a repair process should be performed on a user device, determine whether the user devices satisfy one or more criteria related to a repair type of the repair process, or perform other determinations related to the user device. As an example, with respect to some embodiments, the foregoing determinations may be performed without calculating various depths, lengths, or widths of physical flaws on the user device from the signal-related information (e.g., obtained in response to interactions with the user device). As a further example, the foregoing determinations may be made directly from the signal-related information. In one use case, when signals indicated by the signal-related information match one or more signal patterns associated with a positive result from performance of the repair process (e.g., scratch buffing rendered all scratches practicably unobservable to the naked human eye), repair assessment subsystem 114 may output an indication that the repair process should be performed on the user device (e.g., "Repair," "Repairable," "Buffable," or other outputs). In another case, when the signals match one or more signal patterns associated with a negative result from performance of the repair process (e.g., scratch buffing did not render scratches practicably unobservable to the naked human eye), repair assessment subsystem 114 may output an indication that the repair process should not be performed on the user device (e.g., "Do Not Repair," "Not Repairable," "Not Buffable," or other outputs). In a further use case, when the signals do not match either of the foregoing signal patterns, repair assessment subsystem 114 may output an indication of inconclusiveness (e.g., "Inconclusive," "Unknown Result," etc.). In some use cases, when a non-match occurs, repair assessment subsystem 114 may output an indication that the repair process should be performed on the user device. In other such use cases, repair assessment subsystem 114 may output an indication that the repair process should not be performed on the user device.

In some embodiments, a collection of data points related to detected flaws on user devices (e.g., signal-related information, repair result information, other information with respect to 50 or more user devices, 100 or more user devices, 500 or more user devices, 1000 or more user devices, 10000 or more user devices, 100000 or more user devices, 1000000 or more user devices, etc.) may be obtained and provided to the prediction model to configure or train the prediction model. In some embodiments, model subsystem 116 may obtain information related to signals (e.g., signals corresponding to sound or other mechanical waves, signals corresponding to light or other electromagnetic waves, etc.) coming from one or more user devices and provide such information as input to a prediction model to generate predictions. Feedback subsystem 118 may provide repair result information as reference feedback to the prediction model, and the prediction model may update its configurations (e.g., weights, biases, or other parameters) based on the predictions and the repair result information. In some embodiments, feedback subsystem 118 may provide the repair result information as reference feedback to the prediction model to cause the prediction model to assess its predictions against the repair result information. As an example, the prediction model may update its configurations (e.g., weights, biases, or other parameters) based on its assessment of the predictions. As an example, the predictions generated by the prediction model (e.g., based on the signal-related information) may include predictions related to whether a repair process should be performed on the user devices, predictions related to whether the user devices satisfy one or more criteria related to a repair type of the repair process, or other predictions. The repair result information may include information indicating whether the repair process should be performed on the user devices, information indicating whether the repair process was successful in repairing the user devices with respect to its detected flaws, or other information related to performance of the repair process on the user devices.

In some embodiments, subsequent to the updating of the prediction model, the prediction model may be used to perform an inspection on a user device. As an example, information related to signals from interactions with flaws of the user device may be obtained and provided to the prediction model to obtain one or more predictions from the prediction model. The predictions obtained from the prediction model may be used to determine whether to perform the repair process on the user device, determine whether the user devices satisfy one or more criteria related to a repair type of the repair process, or generate other determinations. As an example, the predictions may include a prediction specifying that the repair process should or should not be performed on the device (e.g., "Repair," "Not Repairable," or other outputs), a prediction specifying that performance of the repair process will produce a satisfiable result (e.g., "Repairable"), a prediction specifying a probability of such satisfiable result (e.g., "X % Likelihood of Satisfiable Result"), or other prediction. In one use case, with respect to a scratch buffing, a satisfiable result may include all scratches being practicably unobservable to the naked human eye or other result.

In some embodiments, the prediction model may be configured such that it generates its predictions without reliance on dimensional information identifying one or more physical dimensions of flaws on a user device. As an example, the foregoing predictions may be generated by the prediction model without the prediction model first calculating the depths, lengths, or widths of physical flaws on the user device. In one scenario, the prediction model may be configured or trained to recognize signal patterns that have a high likelihood of being associated with flaws similar to prior flaws that have been repaired to a satisfiable condition via a given repair process (e.g., based on training on prior information related to flaws and their results from performing the repair process on the flaws). As such, when signal-related information (e.g., indicating signals coming from flaws of the user device) (provided to the prediction model) matches such signal patterns, the prediction model will generate a prediction indicating that the repair process should be performed on the user device (e.g., "Repair," "Repairable," "Buffable," or other outputs). In another scenario, the prediction model may be configured or trained to recognize signal patterns that have a high likelihood of being associated with flaws similar to prior flaws that resulted in an unsatisfiable condition after the repair process was performed on the prior flaws. Thus, when the signal-related information (provided to the prediction model) matches such signal patterns, the prediction model will generate a prediction indicating that the repair process should not be performed on the user device (e.g., "Do Not Repair," "Not Repairable," "Not Buffable," or other outputs).

Example Flowcharts

Figure 4:
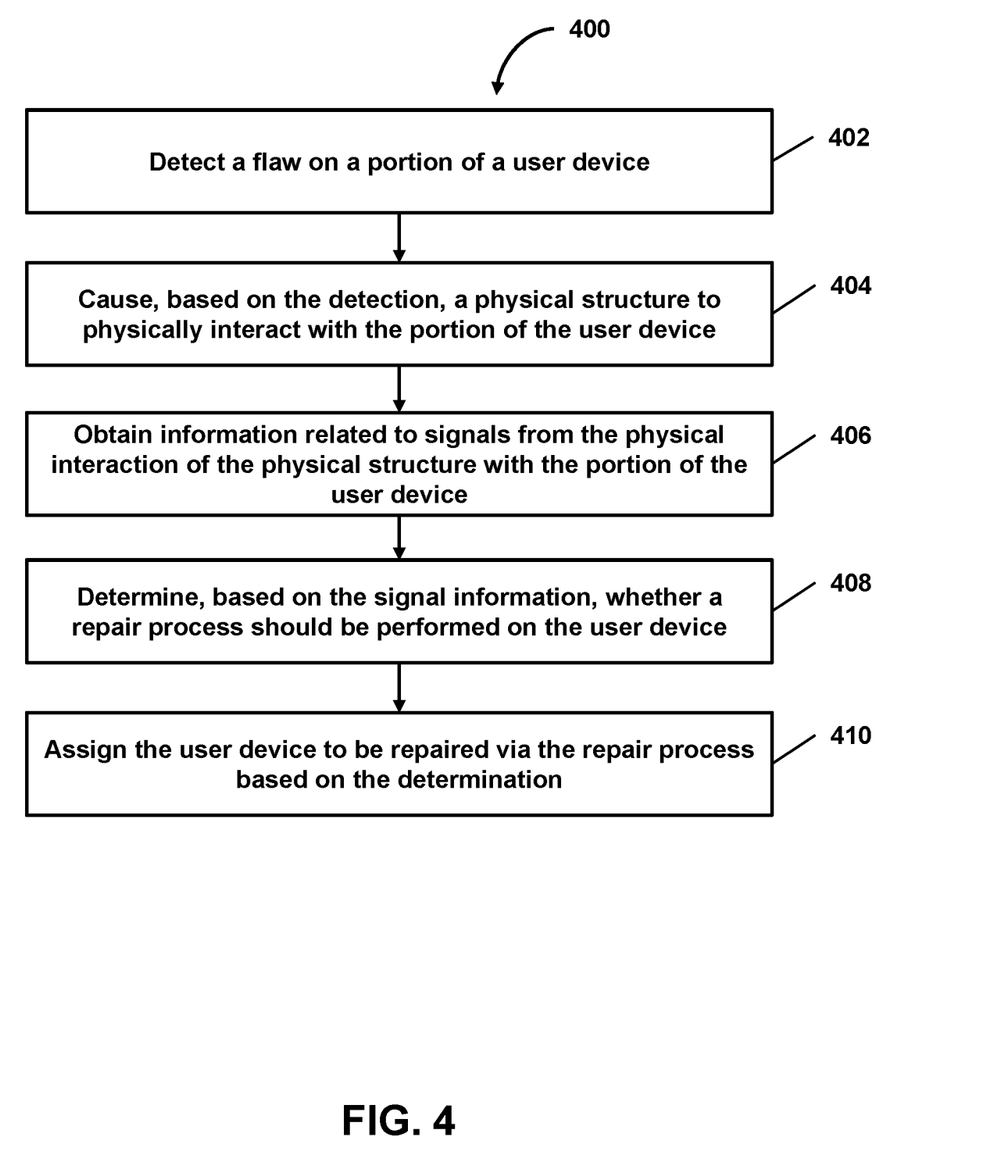
FIG. 4 shows a flowchart of a method of facilitating device inspection or repair via signal-based determinations, in accordance with one or more embodiments.
Figure 5:
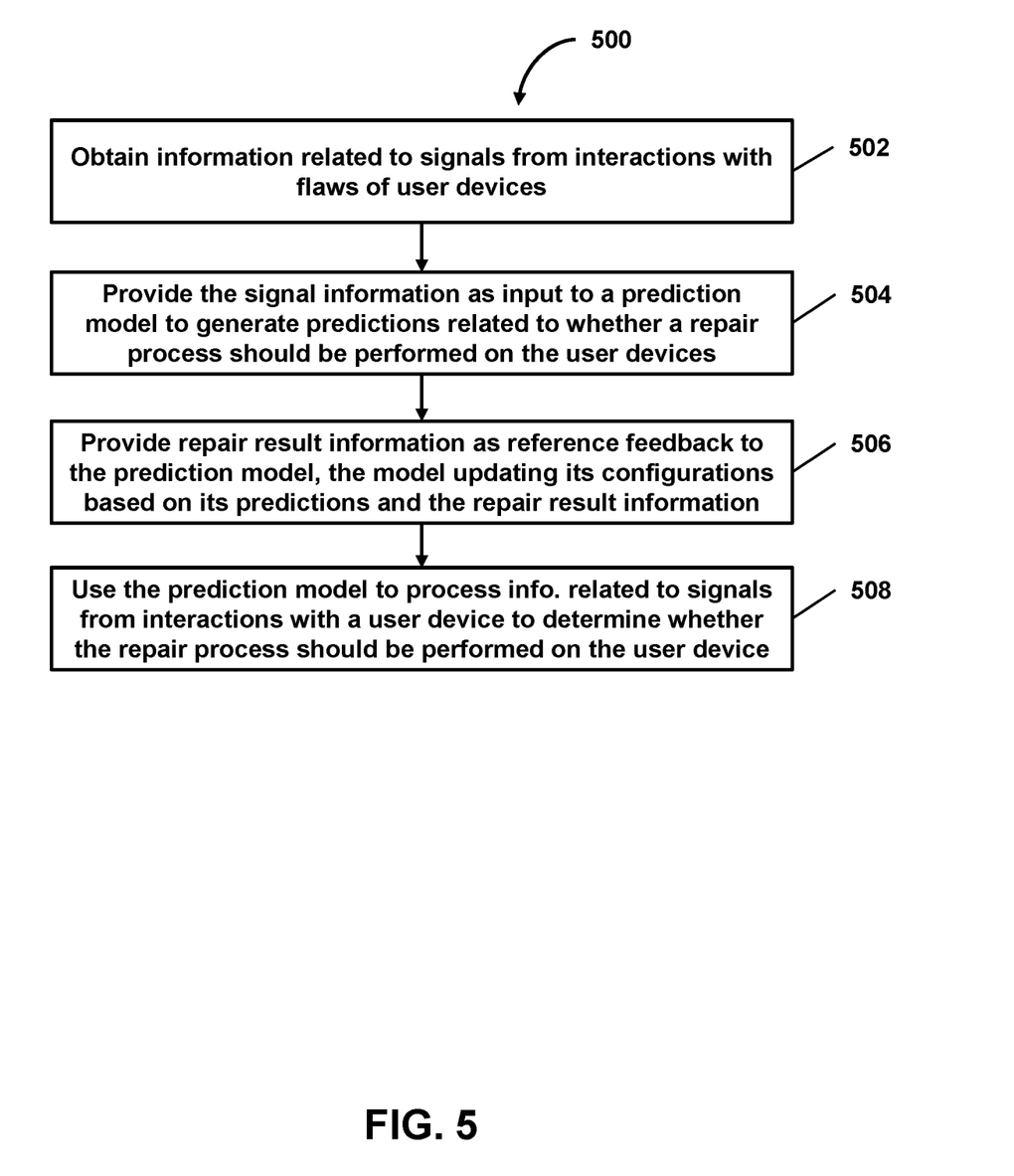
FIG. 5 shows a flowchart of a method of facilitating device inspection or repair via a prediction model, in accordance with one or more embodiments.

FIGS. 4-5 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 4 shows a flowchart of a method 400 of facilitating device inspection or repair via signal-based determinations, in accordance with one or more embodiments. In an operation 402, one or more flaws may be detected on a portion of a user device (e.g., via a camera or other optical sensor, via a microphone or other sound sensor, via physical sensing, etc.). As an example, the flaws may include scratches, cracks, dents, other physical damages, or other flaws. Operation 402 may be performed by a subsystem that is the same as or similar to flaw detection subsystem 112, in accordance with one or more embodiments.

In an operation 404, a physical structure may be caused to physically interact with the portion of the user device based on the detection. As an example, in response to detecting the flaws to be located on the portion of the user device, a record needle (or other physical structure) may be caused to physically interact with the portion of the user device (that includes the detected flaws). Operation 404 may be performed by a subsystem that is the same as or similar to repair assessment subsystem 114, in accordance with one or more embodiments.

In an operation 406, information related to signals from the physical interaction (of the physical structure with the portion of the user device) may be obtained (e.g., via a microphone or other sensor). As an example, the signal information may include information indicating the signals from interaction of the physical structure with the detected flaws, the signals from interaction of the physical structure with other areas of the portion of the user device, or other signals. Operation 406 may be performed by a subsystem that is the same as or similar to repair assessment subsystem 114, in accordance with one or more embodiments.

In an operation 408, a determination of whether a repair process should be performed on the user device may be effectuated based on the obtained information. As an example, at least some of the signals may be from the physical interaction with the detected flaws, and the determination of whether the repair process should be performed on the user device may be based on the signals from the physical interaction of the physical structure with the detected flaws. As another example, the repair process may include buffing of one or more portions of the user device, filling in or painting over structural damages, providing resurfacing or covering of structural damages, or other repair process (e.g., to mitigate the detected flaws or otherwise repair the user device). Operation 408 may be performed by a subsystem that is the same as or similar to repair assessment subsystem 114, in accordance with one or more embodiments.

In an operation 410, the user device may be assigned to be repaired via the repair process based on the determination indicating that the repair process should be performed on the user device. As an example, the repair process may be performed on the user device in response to the assignment of the user device. Operation 410 may be performed by a subsystem that is the same as or similar to repair assessment subsystem 114, in accordance with one or more embodiments.

FIG. 5 shows a flowchart of a method 500 of facilitating device inspection or repair via a prediction model, in accordance with one or more embodiments. In an operation 502, information related to signals from interactions with flaws of one or more user devices may be obtained. Operation 502 may be performed by a subsystem that is the same as or similar to model subsystem 116, in accordance with one or more embodiments.

In an operation 504, the signal information may be provided as input to a prediction model to generate predictions. As an example, the predictions may be related to whether a repair process should be performed on the user devices. In one use case, for each of the user devices, the prediction model may generate a prediction specifying that the repair process should or should not be performed on the user device. In another use case, for each of the user devices, the prediction model may generate a prediction specifying a probability that performance of the repair process will produce a satisfiable result (e.g., buffing of the user device will render all scratches practicably unobservable to the naked human eye). Operation 504 may be performed by a subsystem that is the same as or similar to model subsystem 116, in accordance with one or more embodiments.

In an operation 506, repair result information may be provided as reference feedback to the prediction model. As an example, the repair result information may be related to performance of the repair process on the user devices (e.g., information indicating whether the repair process should be performed on the user devices, information indicating whether the repair process was successful in repairing the user device with respect to its detected flaws, etc.). As another example, the prediction model may update one or more portions of the prediction model based on the predictions and the repair result information. Operation 506 may be performed by a subsystem that is the same as or similar to feedback subsystem 118, in accordance with one or more embodiments.

In an operation 508, subsequent to the updating of the prediction model, the prediction model may be used to perform an inspection on a user device. As an example, information related to signals from interactions with flaws of the user device may be obtained and provided to the prediction model to obtain one or more predictions from the prediction model. The predictions obtained from the prediction model may be used to determine whether to perform the repair process on the user device or to generate other determinations. Operation 508 may be performed by a subsystem that is the same as or similar to repair assessment subsystem 114, in accordance with one or more embodiments.

In some embodiments, the various computers and subsystems illustrated in FIG. 1 may include one or more computing devices that are programmed to perform the functions described herein. The computing devices may include one or more electronic storages (e.g., prediction database(s) 132, which may include training data database(s) 134, model database(s) 136, etc., or other electronic storages), one or more physical processors programmed with one or more computer program instructions, and/or other components. The computing devices may include communication lines or ports to enable the exchange of information within a network (e.g., network 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-118 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-118 described herein is for illustrative purposes, and is not intended to be limiting, as any of subsystems 112-118 may provide more or less functionality than is described. For example, one or more of subsystems 112-118 may be eliminated, and some or all of its functionality may be provided by other ones of subsystems 112-118. As another example, additional subsystems may be programmed to perform some or all of the functionality attributed herein to one of subsystems 112-118.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: obtaining information related to signals coming from at least a portion of the device, the portion of the device comprising one or more flaws of the device; and determining, based on the obtained information, whether a repair process should be performed on the device, whether the device satisfies one or more criteria related to a repair type of the repair process, or whether one or more other processes should be performed on the device.
2. The method of embodiment 1, further comprising: assigning the device to the repair process or the one or more other processes based on the determination indicating that the repair process should be performed on the device, that the device satisfies the one or more criteria, or that the one or more other processes should be performed on the device.
3. The method of any of embodiments 1-2, further comprising: initiating the repair process on the device based on the determination indicating that the repair process should be performed on the device or that the device satisfies the one or more criteria.
4. The method of any of embodiments 1-3, further comprising: causing performance of the repair process based on the determination indicating that the repair process should be performed on the device or that the device satisfies the one or more criteria.
5. The method of any of embodiments 1-4, further comprising: detecting the one or more flaws on the portion of the device; and causing, based on the detection, a physical structure to physically interact with the portion of the device that comprises the one or more flaws of the device, wherein the signals coming from the portion of the device comprises signals from the physical interaction of the physical structure with the portion of the device.
6. The method of any of embodiments 1-5, wherein at least some of the signals are from interaction with the one or more flaws of the device, and wherein the determination of whether the repair process should be performed on the device or whether the device satisfies the one or more criteria is based on the signals from the interaction with the one or more flaws of the device.
7. The method of any of embodiments 1-6, wherein the one or more flaws comprises one or more scratches, cracks, dents, or other flaws.
8. The method of any of embodiments 1-7, wherein the repair process comprises buffing of one or more portions of the device, pulling on one or more portions of the device, or pushing on one or more portions of the device to mitigate the one or more flaws.
9. The method of any of embodiments 1-8, wherein the signals that come from the portion of the device comprises signals corresponding to mechanical waves (e.g., sound or other mechanical waves) or signals corresponding to electromagnetic waves (e.g., light or other electromagnetic waves).
10. The method of any of embodiments 1-9, further comprising: providing training information as input to a prediction model to generate predictions, the training information relating to signals from interaction with flaws of devices.
11. The method of embodiment 10, wherein the predictions are related to whether the repair process should be performed on the devices, whether the devices satisfy the one or more criteria, or whether the one or more other processes should be performed on the device.
12. The method of any of embodiments 10-11, further comprising: providing result information as reference feedback to the prediction model, the prediction model updating one or more portions of the prediction model based on the result information.
13. The method of embodiment 12, wherein the prediction model is configured to assess the predictions against the result information and update the one or more portions of the prediction model based on its assessment of the predictions.
14. The method of any of embodiments 12-13, wherein the result information is related to performance of the repair process or the one or more other processes on the devices.
15. The method of any of embodiments 12-14, wherein the result information indicates whether the repair process or the one or more processes should be performed on the devices.
16. The method of any of embodiments 12-15, further comprising: subsequent to the updating of the prediction model, providing the obtained information as input to the prediction model to determine whether the repair process should be performed on the device, whether the device satisfies the one or more criteria, or whether the one or more processes should be performed on the device.
17. The method of any of embodiments 1-16, wherein the determination indicating that the repair process should be performed on the device, that the device satisfies the one or more criteria, or that the one or more other processes should be performed on the device are performed without reliance on explicit physical dimensions of the one or more flaws.
18. The method of any of embodiments 12-17, wherein the prediction model comprises a neural network or other machine learning model.
19. The method of any of embodiments 1-18, wherein the device comprises a mobile device or a user device.
20. A tangible, non-transitory, machine-readable medium storing instructions that, when executed by a data processing apparatus, cause the data processing apparatus to perform operations comprising those of any of embodiments 1-19.
21. A system comprising: one or more processors; and memory storing instructions that, when executed by the processors, cause the processors to effectuate operations comprising those of any of embodiments 1-19.

What is claimed is:
1. A system for facilitating scratch detection and buffing, the system comprising:
a computer system that comprises one or more processors programmed with computer program instructions that, when executed, cause the computer system to:
provide training information as input to a neural network to generate predictions related to whether scratch buffing should be performed on mobile devices, the training information indicating signals from interactions with scratches of the mobile devices;
provide buffing result information as reference feedback to the neural network to cause the neural network to assess the predictions against the buffing result information, the neural network updating one or more portions of the neural network based on the neural network's assessment of the predictions, the buffing result information relating to performance of scratch buffing on the mobile devices, the buffing result information indicating whether scratch buffing should be performed on the mobile devices;
subsequent to the updating of the neural network, detect, via an optical sensor, one or more scratches on a portion of a mobile device;

cause, based on the detection, a physical structure to physically interact with the portion of the mobile device that comprises the one or more scratches of the mobile device;

obtain information indicating signals from the physical interaction of the physical structure with the portion of the mobile device, at least some of the signals being from interaction of the physical structure with the one or more scratches of the mobile device;

provide the obtained signal information to the neural network to determine whether scratch buffing should be performed on the mobile device, the neural network being configured to provide, without reliance on explicit physical dimensions of the one or more scratches, an output indicating whether scratch buffing should be performed on the mobile device; and initiate an automated buffing process on the mobile device based on the determination indicating that scratch buffing should be performed on the mobile device.

2. The system of claim 1, wherein the computer system is caused to: obtain, from the neural network, an indication to perform scratch buffing on the mobile device, wherein initiating the automated buffing process comprises initiating the automated buffing process on the mobile device based on the indication from the neural network.

3. The system of claim 1, wherein the computer system is caused to:

obtain, from the neural network, a prediction related to a result of performing scratch buffing on the mobile device, wherein determining whether scratch buffing should be performed comprises determining, based on the prediction related to the result, whether scratch buffing should be performed on the mobile device.

4. A method comprising:

detecting one or more flaws on a portion of a user device;

causing, based on the detection, a physical structure to physically interact with the portion of the user device that comprises the one or more flaws of the user device; obtaining, by one or more processors, information indicating signals from the physical interaction of the physical structure with the portion of the user device;

determining, by one or more processors, based on the signal information, whether a repair process should be performed on the user device;

assigning, by one or more processors, the user device to be repaired via the repair process based on the determination indicating that the repair process should be performed on the user device; and causing, by one or more processors, performance of the repair process based on the assignment of the user device.

5. The method of claim 4, wherein at least some of the signals are from interaction of the physical structure with the one or more flaws of the user device, and wherein the determination of whether buffing should be performed on the user device is based on the signals from the interaction of the physical structure with the one or more flaws of the user device.

6. The method of claim 4, wherein the one or more flaws comprises one or more scratches, cracks, or dents.

7. The method of claim 4, wherein the repair process comprises buffing of the user device to mitigate the one or more flaws.

8. The method of claim 4, further comprising:

providing, by one or more processors, training information as input to a prediction model to generate predictions related to whether the repair process should be performed on user devices, the training information indicating signals from interaction with flaws of the user devices;

providing, by one or more processors, repair result information as reference feedback to the prediction model, the prediction model updating one or more portions of the prediction model based on the predictions and the repair result information, the repair result information relating to performance of the repair process on the user devices, the repair result information indicating whether the repair process should be performed on the user devices; and subsequent to the updating of the prediction model, providing, by one or more processors, the signal information as input to the prediction model to determine whether the repair process should be performed on the user device.

9. The method of claim 8, further comprising:

obtaining, by one or more processors, from the prediction model, an indication to perform the repair process on the user device, wherein assigning the user device comprises assigning the user device to be repaired via the repair process based on the indication from the prediction model.

10. The method of claim 8, further comprising:

obtaining, by one or more processors, from the prediction model, a prediction related to a result of performing the repair process on the user device, wherein determining whether the repair process should be performed comprises determining, based on the prediction related to the result, whether the repair process should be performed on the user device.

11. A non-transitory computer-readable media comprising instructions that, when executed by one or more processors, cause operations comprising:

obtaining information indicating signals from physical interaction of a physical structure with at least a portion of a user device, the portion of the user device comprising one or more flaws of the user device;

determining, based on the signal information, whether a repair process should be performed on the user device;

assigning the user device to be repaired via the repair process based on the determination indicating that the repair process should be performed on the user device; and causing performance of the repair process based on the assignment of the user device.

12. The non-transitory computer-readable media of claim 11, the operations further comprising:

detecting the one or more flaws on the portion of the user device; and causing, based on the detection, the physical interaction of the physical structure with the portion of the user device.

13. The non-transitory computer-readable media of claim 11, wherein at least some of the signals are from interaction of the physical structure with the one or more flaws of the user device, and wherein the determination of whether the repair process should be performed on the user device is based on the signals from the interaction of the physical structure with the one or more flaws of the user device.

14. The non-transitory computer-readable media of claim 11, wherein the one or more flaws comprises one or more scratches, cracks, or dents.

15. The non-transitory computer-readable media of claim 11, wherein the repair process comprises buffing of the user device to mitigate the one or more flaws.

16. The non-transitory computer-readable media of claim 11, the operations further comprising:
  providing training information as input to a prediction model to generate predictions related to whether the repair process should be performed on user devices, the training information indicating signals from interaction with flaws of the user devices;
  providing repair result information as reference feedback to the prediction model, the prediction model updating one or more portions of the prediction model based on the predictions and the repair result information, the repair result information relating to performance of the repair process on the user devices, the repair result information indicating whether the repair process should be performed on the user devices; and
  subsequent to the updating of the prediction model, providing the signal information as input to the prediction model to determine whether the repair process should be performed on the user device.

17. The non-transitory computer-readable media of claim 16, the operations further comprising:
  obtaining, by one or more processors, from the prediction model, an indication to perform the repair process on the user device,
  wherein assigning the user device comprises assigning the user device to be repaired via the repair process based on the indication from the prediction model.

18. The non-transitory computer-readable media of claim 16, the operations further comprising:
  obtaining, by one or more processors, from the prediction model, a prediction related to a result of performing the repair process on the user device,
  wherein determining whether the repair process should be performed comprises determining, based on the prediction related to the result, whether the repair process should be performed on the user device.

* * * * *